(12) United States Patent
Smiley et al.

(10) Patent No.: US 9,665,843 B2
(45) Date of Patent: May 30, 2017

(54) INDUSTRIAL ASSET HEALTH PROFILE

(71) Applicant: ABB Research Ltd., Zurich (CH)

(72) Inventors: Karen J. Smiley, Raleigh, NC (US); Shakeel M. Mahate, Raleigh, NC (US); Chihhung Hou, Morrisville, NC (US); Paul F. Wood, Rocklin, CA (US)

(73) Assignee: ABB SCHWEIZ AG, Baden (CH)

( * ) Notice: Subject to any disclaimer, the term of this patent is extended or adjusted under 35 U.S.C. 154(b) by 927 days.

(21) Appl. No.: 13/908,425

(22) Filed: Jun. 3, 2013

(65) Prior Publication Data

US 2014/0358601 A1 Dec. 4, 2014

(51) Int. Cl.
*G06Q 10/06* (2012.01)

(52) U.S. Cl.
CPC .................. *G06Q 10/0635* (2013.01)

(58) Field of Classification Search
USPC ........................................ 705/7.11
See application file for complete search history.

(56) References Cited

U.S. PATENT DOCUMENTS

| 7,103,509 | B2 * | 9/2006 | Shah | G01D 3/08 700/52 |
| 7,634,384 | B2 * | 12/2009 | Eryurek | G05B 15/02 700/95 |
| 2002/0078403 | A1 * | 6/2002 | Gullo | G06F 11/008 714/37 |
| 2006/0206246 | A1 * | 9/2006 | Walker | G06Q 10/00 701/16 |
| 2006/0282362 | A1 * | 12/2006 | Nasr | G06Q 10/06 705/35 |
| 2007/0067678 | A1 * | 3/2007 | Hosek | G05B 23/0235 714/25 |
| 2008/0162088 | A1 * | 7/2008 | DeVaul | A61B 5/0024 702/190 |
| 2009/0089709 | A1 | 4/2009 | Baier et al. | |
| 2009/0204458 | A1 * | 8/2009 | Wiese | G06Q 10/06 717/101 |
| 2009/0240604 | A1 * | 9/2009 | Thurston | G06Q 10/0875 705/29 |
| 2009/0281856 | A1 * | 11/2009 | Meyer | G06Q 10/0635 705/7.28 |
| 2010/0214069 | A1 | 8/2010 | Kong | |

(Continued)

OTHER PUBLICATIONS

Int. Search Report cited in PCT Application No. PCT/US2014/040157 dated Feb. 10, 2015, 8 pgs.

*Primary Examiner* — Thomas L Mansfield, Jr.
(74) *Attorney, Agent, or Firm* — Cooper Legal Group, LLC

(57) ABSTRACT

Among other things, one or more techniques and/or systems are provided for developing a health profile of an industrial asset based upon data pertaining to such an industrial asset. At least some of the data is transformed into primary state indicators, respectively representative of the status or condition of an aspect of the industrial asset. Using the primary state indicators, one or more events that are likely to occur to the industrial asset are identified and a health profile is developed based upon such events. The health profile may describe maintenance actions that will reduce a likelihood of an event(s) occurring, may describe a business impact on an entity associated with the industrial asset if an event(s) occurs, and/or may describe a performance impact on the industrial asset if an event(s) occurs, for example.

20 Claims, 7 Drawing Sheets

(56) References Cited

U.S. PATENT DOCUMENTS

| | | |
|---|---|---|
| 2011/0125419 A1 | 5/2011 | Bechhoefer et al. |
| 2012/0023058 A1* | 1/2012 | Mohagheghi ...... G05B 23/0278 706/52 |
| 2013/0096699 A1* | 4/2013 | Sundaram .......... G05B 23/0254 700/79 |
| 2014/0165731 A1* | 6/2014 | Linford ................ G01M 3/243 73/592 |
| 2014/0365191 A1 | 12/2014 | Zyglowicz et al. |
| 2014/0365271 A1 | 12/2014 | Smiley et al. |

\* cited by examiner

| PRIMARY STATE INDICATOR | POSSIBLE EVENTS | CONFIDENCE |
|---|---|---|
| Broken Seal | Environmental Contamination | 30% |
| Fluid leakage | Environmental Contamination<br>Fire | 90%<br>20% |
| Hotspots | Fire<br>Outage | 50%<br>30% |
| Abnormal vibration | Outage | 20% |

FIG. 4

| HEALTH PROFILE FOR TRANSFORMER # 134562 |
|---|
| Risks/Impacts:<br><br>    <u>Environmental Event:</u> 90% likelihood of occurence<br>    Performance Impact: None<br>    Business Impact: Possible fine of $20,000<br><br>    <u>Fire Event:</u> 20% likelihood of occurence<br>    Performance Impact: Two day outage<br>    Business Impact: Repair/replacement cost of $10,000<br>              ~20,000 customers without power<br>              Customer sentiment drop of about 3% |
| Suggested Maintenance/Outcome of Maintenance:<br><br>    <u>Repair seal:</u> Cost ~$450<br>    Longevity: 6 months<br>    <u>Replace seal:</u> Cost ~$2000<br>    Longevity: 5 years |

FIG. 5

INDUSTRIAL ASSET HEALTH PROFILE

BACKGROUND

The present application relates to industrial assets and more particularly to systems and/or techniques for developing a health profile of an industrial asset. The systems and/or techniques find particular application to industrial assets of a power system, such as transformers, but may also find applicability in non-power related industries where it may be useful to analyze data pertaining to an industrial asset to develop a health profile which describes a condition of the asset, describes actions that may be performed to mitigate the likelihood or impact of an event occurring (e.g., such as an outage or fire), and/or describes the impact of such an event, for example.

A power system comprises an abundance of industrial assets, such as a network of equipment comprising electrical equipment and non-electrical equipment used to supply, transmit, and/or use electrical power. Electrical equipment of such a system include, among other things, turbines, transformers, circuit breakers, capacitors, voltage regulators, batteries, and power lines, for example. Non-electrical equipment of such a system may include, among other things, storage cabinets, poles, and transmission towers, for example. Often, such equipment is designed to last decades, and the degradation or failure of such equipment may result in the loss of power to consumers, may cause cascading or increased damages to operational systems or the surrounding environment, and/or may result in fines being levied against a utility provider. Accordingly, preemptive maintenance may be desirable to mitigate a risk of failure and/or to mitigate associated impacts, such as on industrial operations or business objectives, particularly in aging equipment.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

According to an aspect, a system for developing a health profile of an industrial asset is provided. The system comprises a transformation application component configured to apply a first transform to a first portion of data pertaining to the industrial asset to derive a first primary state indicator. In some embodiments, the transformation application component may also apply second, third, and/or subsequent transforms to second, third, and/or subsequent portions of the data to derive additional primary state indicators. The portions of data relevant to respective transforms may be disjointed or overlapping. The system also comprises a mapping component configured to map (e.g., correlate) one or more primary state indicators (e.g., or combinations thereof) to zero or more events that, based upon a status of the first primary state indicator, are likely to occur to the industrial asset. The system also comprises a development component configured to develop the health profile of the industrial asset based upon the indicators and/or events.

According to another aspect, a method for developing a health profile of an industrial asset is provided. The method comprises acquiring data pertaining to the industrial asset and applying a first transform to at least some of the data to derive a first primary state indicator. The method also comprises mapping the first primary state indicator to an event that, based upon a status of the first primary state indicator, is likely to occur to the industrial asset. The method further comprises developing the health profile of the industrial asset based upon the indicator and/or the event. In some embodiments, a health profile may characterize probable conditions and events, likelihoods, impacts, and recommended actions under a certain scenario. For example, the health profile may reflect the expected health of an asset under normal operations or the expected health under a non-normal scenario, such as operational stress or a major storm. Such scenario-based profiles may be used to indicate the resilience or vulnerability of the asset under various operational circumstances.

According to yet another aspect, a computer readable medium comprising processor executable instructions that when executed via a processing unit perform a method is provided. The method comprises acquiring data pertaining to an industrial asset, the data representative of at least one of measurements or observations recorded during a specified data collection period. The method also comprises applying a first transform to at least some of the data to derive a first primary state indicator. The method also comprises mapping the first primary state indicator to an event that, based upon a status of the first primary state indicator, is likely to occur to the industrial asset during a specified health period. The method also comprises developing the health profile of the industrial asset indicative of a health of the industrial asset during the specified health period based upon the event, wherein the health profile comprises at least one of: a health condition aspect describing one or more conditions of the industrial asset during the specified health period, a health action aspect describing at least one of a maintenance action or an operational action that will reduce a likelihood of the event occurring and/or reduce the impact of the event on the asset, or a health event aspect describing a likely business impact on an entity associated with the industrial asset if the event does occur and/or describing a likely performance impact to the industrial asset or to operations involving the asset if the event does occur.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 4 illustrates an example mapping configured to map one or more primary state indicators to events.

FIG. 5 illustrates an example health profile.

DETAILED DESCRIPTION

Figure 1:
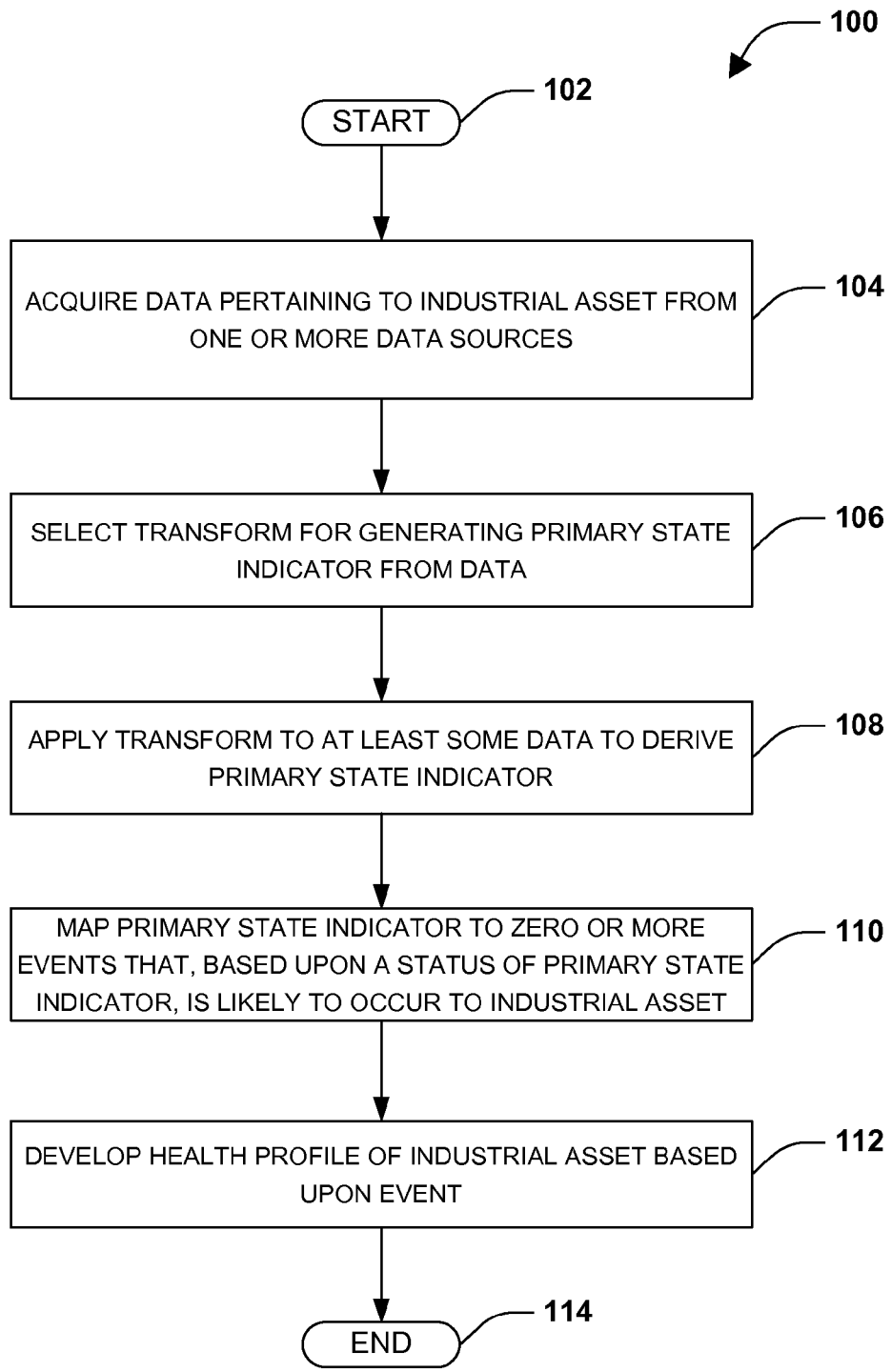
FIG. 1 is a flow diagram illustrating an example method for developing a health profile of an industrial asset.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

A power system comprises thousands if not millions of industrial assets that include both electrical equipment and non-electrical equipment. Utility providers and other entities routinely monitor and/or inspect such electrical equipment and/or non-electrical equipment to assess the health of equipment, assess efficiency of the equipment, and/or detect early signs of failure, etc.

Numerous techniques have been utilized to perform such health assessments and/or to detect early signs of failure. For example, sensors may be coupled to equipment and may be configured to measure various properties of the equipment (e.g., internal temperature, ambient air temperature, dissolved gas concentration, load, stresses on the equipment, structural fatigue of the equipment, etc.). In some embodiments, measurements derived from such sensors are used to compute a health score indicative of the present health of the equipment. In other embodiments, operational data from the equipment or other equipment are used to determine the health score. In still other embodiments, operational and sensor data are combined. Various scoring techniques are also utilized. For example, equipment may be assigned a health score from 0 to 100, where a health score of 100 indicates that the equipment is presently very healthy and a health score of 0 indicates that the equipment is presently on the verge of failure or has failed. As another example, equipment may be rated as above standard or below standard. In some embodiments, maintenance technicians or planners develop maintenance schedules for prioritizing maintenance on equipment based upon the health scores.

While such a health score is a useful tool when developing maintenance schedules, the health score typically offers an incomplete picture of the overall health of the equipment. For example, such a score typically provides little to no information that assists a maintenance technician in troubleshooting problems with the equipment. Moreover, the operational or business impact and/or significance of failing equipment are typically unknown from the health score. For example, it may be unknown whether the equipment poses a fire risk or an environmental risk (e.g., which could pose a financial liability on an entity responsible for the equipment).

Accordingly, one or more systems and/or techniques are provided for developing a health profile of an industrial asset, such as electrical equipment or non-electrical equipment of a power system. The health profile may include information derived by transforming the operational, sensor, and/or other data to draw conclusions about the condition of the industrial asset (e.g., and/or one or more elements of the industrial asset) and/or about the causes and/or factors contributing to the condition.

In some embodiments, one or more confidences are associated with respective conclusions or with an overall health score of the industrial asset. By way of example, there may be a cone of uncertainty around a conclusion or prediction. For example, the health profile may include a first prediction or probability (e.g., where a probability may comprise a distribution (e.g., a symmetric distribution such as 40%+/−5%, or an asymmetric distribution such as a minimum probability of 35% with a maximum probability of 50%, and/or an expected probability of 40%)) of an outage event occurring in two months, a second probability of an outage event occurring in one year, and a third probability of an outage event occurring in five years. Respective probabilities may be associated with a confidence metric, such as a cone of uncertainty. For example, the first probability of the outage event occurring in two months may be associated with a higher confidence metric than the third probability of the outage event occurring in five years because an amount of uncertainty increases over time (e.g., the more distant the event, the more likely it is that conditions will deviate from conditions upon which the probability is predicated). As another example, the longer an asset continues to operate under certain conditions without an outage, the less certain it may become that the asset will eventually fail under those conditions; so the probability may decrease while the confidence increases. In still other embodiments (e.g. where the probability of an outage event associated with degradation might increase over time), there may be less confidence associated with predicting an outage event in the short term, but high confidence in predicting an outage within the longer time period. As an example, confidence may be very high in predicting that an asset is 95-100% likely to fail within 5 years, but confidence may be low in predicting that the asset is 30-50% likely to fail within the next 6 months. Also, the quality, sensitivity, and/or freshness of data used to make a conclusion or prediction could narrow, widen, shift, or skew the confidence profile. Confidence may also be influenced by the stability or trajectory of one or more data elements during an assessment period.

To develop a health profile, operational data (e.g., including data related to outages and/or other historical data, etc.), sensor data, maintenance data, and/or other data (e.g., weather data and/or other externally sourced data, etc.) corresponding to a specified data collection period is acquired. Such a data collection period may correspond to past, present, and/or future times and in some embodiments is user specified. In other embodiments, the data collection period may be based upon characteristics of the asset, e.g., a past or expected reliability of the asset, an asset type, an asset family within the asset type, and/or an industrial domain in which the asset is used, for example. In still other embodiments, a subset of the overall asset data collection period may be similarly selected for conducting analyses on asset elements or on subsets of observation data. By way of example, different elements of a transmission tower may have a different expected lifespan. For example, a first asset element of the transmission tower, such as metal support structures, may have a life expectancy of 50 years and may be subject to failures related to metal fatigue while a second asset element of the transmission tower, such as a bushing element, may have a life expectancy of 15 years and may be subject to failures related to corrosion decay. Accordingly, a first subset of the overall asset data collection period may be defined for the first asset element and a second subset of the overall asset data collection period may be defined for the second asset element.

Moreover, operational, sensor, and/or other data may be predicted (e.g., interpolated and/or extrapolated) in situations where actual operational, sensor, and/or other data of a desired quality, completeness, etc. is unavailable for at least a portion of the data collection period. For example, a user may wish the health profile to be developed based on data acquired during the past year and data forecasts for the next month. Accordingly, the data that is acquired may include data generated during the past month and forecasts for the next month (e.g., such as internal temperature forecasts for the next month, which may be derived at least in part from the internal temperature data collected during the past month).

Using the data acquired during the specified data collection period, a health profile may be developed indicative of the predicted or known health of the industrial asset during a specified health period. Such a health period may correspond to past, present, and/or future times and in some embodiments is user specified. In other embodiments, the health period may be based at least in part on characteristics of the asset, e.g., a past or expected reliability of the asset, an asset type, an asset family within the asset type, and/or an industrial domain in which the asset is used, for example. In still other embodiments, the health period may be based at least in part on characteristics of the quality, sensitivity, freshness, and/or confidence profiles for the observation data available for the analysis. By way of example, a user may request that a health profile of the industrial asset be developed which forecasts the health of the industrial asset for the next five years (e.g., the specified health period is from now through five years from now), based upon data acquired and data forecasts for the next month (e.g., the specified data collection period includes data collected during the last month and forecasted data for the next month). Using such data, a health profile may be developed indicative of the likely health of the industrial asset when the specified two-months of data is considered. As another example, a user may request that a health profile of the industrial asset be developed that is indicative of the health of the industrial asset relative to day 1 of each month of the last 5 preceding fiscal years, based upon all or substantially all data acquired through the respective 60 'day 1' dates, and data that was forecasted at that time for the next month. As another example, the health period may be determined based upon the quality of data available during the data collection period. For example, the health period may be limited to one year when it is determined that observation data of a desirable quality is merely available for the most recent two year of the data collection period.

In some embodiments, the health profile includes one or more distinct aspects which respectively describe one or more conditions to be taken into account when evaluating the overall health of the industrial asset. By way of example, the health profile may include a health condition aspect, a health event aspect, and/or a health action aspect.

In some embodiments, the health condition aspect uses a plurality of data sources and/or observations over the specified data collection period, to describe a condition(s) of the industrial asset over the specified health period, and/or to describe a condition(s) of one or more elements of the industrial asset over the specified health period. In some embodiments, the health condition aspect may include data which characterizes one or more causes or factors contributing to the condition over the specified health period. In some embodiments, the health condition aspect may include data which characterizes the quality, freshness, precision, sensitivity, and/or completeness of the data sources and/or observations.

In some embodiments, the health event aspect combines the health condition aspect with a plurality of data sources to derive zero or more events that are likely to result from the specified health period (e.g., from the specified health period onward). Such events may differ by degree or type of impact, and such events may have varying levels of likelihood (e.g., confidence, accuracy, and/or sensitivity), and/or the timeframe during which various events are likely to occur may differ. In some embodiments, the health event aspect may include expected business performance impacts from individual events and/or pluralities of events, according to one or more business objective measures (which may be either quantitative or qualitative in nature).

In some embodiments, the health action aspect combines the health event aspect and health condition aspect with a plurality of data sources to derive zero or more sets of possible action plans which can (optionally) be performed during the specified health period and/or during another desired time period to improve the condition of the asset and/or to reduce the likelihood of one or more events and/or impacts thereof from occurring. Respective action plans may include one or more actions, such as an operational change activity, a diagnostic change activity, and/or a maintenance activity (e.g., a repair activity, refurbish activity, and/or replacement activity, etc.). By way of example, a diagnostic change activity may comprise, among other things, requesting that the additional data and/or different data (e.g., a new type of data, data acquired over short time intervals, etc.) on the asset be acquired and/or may request that a particular inspection, test, or measurement be performed on the data to improve predications regarding the health of the asset and/or to improve a confidence in such predictions, for example. Further, in some embodiments, respective actions can be associated with a timeframe during which it is recommended that the action(s) be performed. In some embodiments, the health action aspect may further include a revised health condition aspect describing the predicted condition of the industrial asset if the action plan is followed and/or may include a revised health event aspect describing the impact performing such an action plan may have on industrial operations and/or business objectives, for example.

Referring to FIG. 1, an example method 100 for developing a health profile of an industrial asset, such as electrical equipment, is provided. The example method 100 begins at 102, and data pertaining to the industrial asset is acquired from one or more data sources at 104. Such sources can include, among other things, enterprise resource planning (ERP) systems (ERPs), enterprise asset management (EAM) systems, relational databases, columnar databases, unstructured databases, graph databases, document store databases, business intelligence (BI) systems, databases associated with a manufacturer(s) of the industrial asset (e.g., manufacturer databases), master data management (MDM) repositories, operational historians, non-operational historians (e.g. for sensor data), and/or other sources from which data pertaining to the industrial asset of interest and/or similar industrial assets (e.g., configured similarly to the industrial asset of interest and/or performing a same function/role as the industrial asset of interest, etc.) may be acquired.

The data may be comprised within, among other things, still images (e.g., photo images, thermal images, infrared images, etc.), videos (e.g., photographic video, thermal video, infrared video, etc.), audio recordings, chemical analysis reports, word processing documents, spreadsheet files, portable document format (PDF) documents, etc. Moreover, the types of data acquired may include observational data (e.g., such as data representative of video recordings, still images, audio recordings, odor (e.g., a chemical analysis of an area (e.g., of air) proximate the industrial asset, or other sensory information acquired from sensors positioned spatially proximate the industrial asset and/or mounted to a robot), numerical data (e.g., representative of discrete events, such as field test, and/or streamed events, such as substantially continuous readouts from sensors), and/or textual data (e.g., which may be structured, semi-structured, and/or unstructured), for example.

Such data may be generated from various types of activities and may describe the industrial asset in various operational states. For example, some of the data acquired at 104 may include data generated from testing at a manufacturing facility (e.g., such as during heat run tests) and/or testing during installation, and may describe performance of the industrial asset during such times. Other data acquired at 104 may include data generated from scheduled or unscheduled maintenance and/or inspections, and may describe the types of maintenance performed, observations made during the maintenance and/or inspections, parts replaced during the maintenance, cost of performing such maintenance, etc. Still other data acquired at 104 may include data generated from an outage, such as the cause of the outage, monetary cost of the outage, impact of the outage on customers, etc. Still other data acquired at 104 may include data generated during normal operation, which may describe an operating environment (e.g., ambient temperature, weather conditions, etc.) and/or operating conditions (e.g., load placed on the industrial asset, internal temperature, etc.). It is to be appreciated that the foregoing examples are not meant to be limiting, and thus the scope of the disclosure, including the scope of the claims, is not intended to be limited to the examples provided herein.

In some embodiments, the data that is acquired is limited to data acquired within a specified data collection period (e.g., corresponding to a timeframe in which it is desirable to base a health assessment represented in a health profile). By way of example, a user may specify a date range and merely data generated during the specified data range may be acquired at 104. In other embodiments, the received data includes data acquired during the lifetime of the industrial asset and the data may be filtered based upon the specified data collection period.

In some embodiments, the acquired data may represent information derivable from actual measurements and/or observations. By way of example, data yielded from sensors and/or field test may be pre-processed (e.g., cleaned) prior to the acquisition to normalize such data, identify outliers in such data, make adjustments for missing data, etc. Moreover, the specified data collection period may extend into the future. Thus, measured data and/or actual observations, for example, may be extrapolated and/or projected such that data can be acquired that extends through the specified data collection period. By way of example, the specified data collection period may extend from next week until 3 months from now. Accordingly, the measured data and/or actual observations, for example, may be projected over the specified data collection period and data representative of the projections may be acquired at 104.

In some embodiments, at least a portion of the received data may be reconciled to a uniform frame of time reference. For example, data stored in a first data source may be recorded in Pacific Standard Time and data stored in a second data source may be recorded in Eastern Daylight Time. In some examples, the data stored in the first data source is reconciled to convert timestamps associated with such data from Pacific Standard Time to Eastern Daylight Time. In other examples, the data stored in the first data source and the second data source are converted to another time reference, such as coordinated universal time, for example. Other (non-time) data may also be reconciled to achieve a desired level of uniformity. For example, units of measurements may be reconciled (e.g., converting U.S. measurements to metric measurements, etc.).

In some embodiments, the data that is acquired at 104 has been pre-processed to associate the data with a particular industrial asset, to identify possible outliers in the data, normalize the data, and/or to account for missing or incomplete datasets, for example. By way of example, analytical, iterative, or other image/pattern recognition techniques may be performed on an image to associate an industrial asset with the image. For example, a video camera may be configured to pan a substation. The video or image captures derived therefrom may be pre-processed using pattern recognition techniques and/or other object recognition techniques to identify portions of the video or image captures representative of a particular transformer. In this way, video or images of the transformer can be identified and tagged with a unique identifier associated with the transformer (e.g., to identify the video data or image data as pertaining to the transformer), for example. As another example, analytical, iterative, or other cleaning techniques (e.g., interpolation or extrapolation techniques) can be used to normalize at least some of the data (e.g., such as numerical data derived from sensors or field tests), identify outliers in at least some of the data, estimate data for time windows when data was not recorded (e.g., time windows when there are a break in measurements due to a failed sensor or transmitter), etc.

At 106 in the example method 100, a transform is selected for generating a primary state indicator from the received data, and the selected transform is applied to at least some of the data at 108 to derive a primary state indicator. A transform describes a process (e.g., a machine learning algorithm, a set of rules, image/pattern recognition technique, etc.) by which a set of data is analyzed to generate a primary state indicator. The primary state indicator describes a state of one or more characteristics of the industrial asset at a specified time or during a specified time window. By way of example, in some embodiments, a primary state indicator describes the presence or extent of, among other things, a condition of the asset or a condition affecting the asset (e.g. a gas or fluid volume level, gas concentration levels or trends, internal or ambient temperature profile variances from normal, etc.). In other embodiments, the primary state indicator may describe the presence or extent of, among other things, line sag, hotspots, line degradation, undesirable odors, undesirable vibrations, fluid leakage, gas leakage, etc. In some embodiments, where there are no conditions that are negatively affecting the asset, the primary state indicator is configured to indicate that the industrial asset is healthy (e.g., and thus the health profile generated from the primary state indicators indicates that there are no adverse events likely to occur to the industrial asset during the period of time specified by the health period).

In some embodiments, more than one transform may be selected at 106 and a plurality of primary state indicators may be derived at 108. By way of example, a first transform may be selected to apply to a first portion of the data to derive a first primary state indicator and a second transform may be selected to apply to a second portion of the data to derive a second primary state indicator. In this way, a plurality of primary state indicators can be derived, where respective primary state indicators may focus on the state of a particular aspect(s) of the industrial asset (e.g., cabling, fluids, gasses, particular parts, etc.).

By way of example, acquired data representative of thermal images of the industrial asset may be analyzed by a first transform configured to identify the existence of hotspots presently within the industrial asset or to describe a change in the hotspots over a specified time window. As another example, acquired data representative of audio recordings may be analyzed by a second transform configured to identify undesirable/abnormal vibrations occurring within the industrial asset. As another example, acquired data representative of aerial images may be analyzed by a third transform configured to describe the degradation of a coating on the industrial asset (e.g., a line coating has degraded by 60% in the last year).

Still other examples that illustrate how transforms may be applied to at least some of the data to derive primary state indicators include: 1) estimating line sag based upon data representative of aerial images of a cable (e.g., a power line); 2) classifying degradation of a cable coating or splice based upon data representative of an aerial images; 3) estimating galloping conductor conditions based upon data representative of a video recording captured by a drone or other video sensor; 4) identifying hotspots based upon data representative of thermal images; 5) estimating the condition of one or more parts of the industrial asset based upon data representative of thermal images and the spatial proximity of identified hotspots to the one or more parts; 6) identifying fluid leakage and/or gas leakage based upon data representative of the chemical composition of an area (e.g., of air) analyzed by an olfactory sensor; etc.

In some embodiments, the primary state indicator includes a confidence measure indicative of the confidence in the primary state indicator. For example, the confidence measure may indicate the certainty of a classification or estimate (e.g., there is a 90% certainty that the cable has degraded by at least 40%), may indicate a precision of the classification or estimate (e.g., the cable has degraded by 40% with a margin of error of 3%), etc. Such a confidence measure may be derived based upon the amount and/or quality of data available, for example. Similar to the confidences associated with a conclusion or prediction, in some embodiments the confidence measure on a primary state indicator might be a profile (e.g. a cone of uncertainty), and not just a single value.

In some embodiments, the selection and application of a transform comprises mapping a transform to a data bin and applying the transform to data comprised with the data bin. By way of example, the data acquired at 104 may be binned into a set of data bins, where a first data bin comprises data representative of a first type of information and a second data bin comprises data representative of a second type of information, etc. For example, data representative of the internal temperature of the industrial asset may be binned into a first data bin to which a first transform has been mapped, data representative of ambient air temperature may be binned into a second data bin to which a second transform has been mapped, data representative of dissolved gas concentrations may be binned into a third data bin to which a third transform has been mapped, data representative of aerial images depicting the industrial asset may be binned into a fourth data bin to which a fourth transform has been mapped, data representative of audio recordings may be binned into a fifth data bin to which a fifth transform has been mapped, data representative of thermal images depicting the industrial asset may be binned into a sixth data bin to which a sixth transform has been mapped, etc. In this way, the transform that is applied to respective data bins is predefined such as by a user, for example. In some embodiments, one or more transforms may be selected from a repository of techniques according to specified criteria, such as the type of industrial asset, 'nameplate' information about the industrial asset, and/or the source of data. In some other embodiments, the criteria for selecting transforms for an asset may be specific to the individual asset.

A transform is defined by an algorithm or set of rules which describe how data is to be processed to output desired information. By way of example, a first transform, configured to output estimated measurements of line sag, may describe how to identify cables within data representative of aerial images (e.g., using image/pattern recognition techniques) and/or may describe a process by which line sag for the identified cables is measured (e.g., measure the distance between a first cable and a second cable at various points along the cables within the image). As another example, a second transform, configured to identify abnormal vibrations, may be configured to compare frequency information from data representative of audio recordings with a baseline set of frequencies to identify frequencies not included in the baseline set of frequencies. In some embodiments, the same data (e.g., a video recording) may be assigned to multiple bins for use in multiple transforms. Moreover, while reference is made here to using transforms to generate one or more primary state indicators, as will be further described below, the same or different transforms may also be used to generate a secondary state indicator (e.g., by combining two or more primary state indicators), to generate the health profile or an aspect thereof (e.g., such as a health condition aspect, health event aspect, and/or health action aspect), In some embodiments, one or more transforms may include machine learning algorithms or other training algorithms. For example, in some embodiments, a maintenance technician may initially identify cables within aerial images. Machine learning algorithms may be configured to analyze the identifications made by the maintenance technician to identify commonalities (e.g., common shapes, intensities, etc.) in portions of the images that are identified as representative of the cables. In this way, the machine learning algorithms can develop image/pattern recognition techniques for identifying objects within other aerial images that are likely to be cables. As another example, historical data representative of audio recordings may be analyzed to develop a baseline set of frequencies from which to compare other audio recordings to determine if abnormal vibrations are observed within the other audio recordings.

At 110 in the example method 100, a primary state indicator is mapped to zero or more events that, based upon a status of the primary state indicator and/or a transformation thereof, is likely to occur to the industrial asset. That is, stated differently, the primary state indicators are analyzed to determine what, if any, events are likely to occur to the industrial asset in view of the status of one or more primary state indicators and/or to determine a likelihood of such an event(s) occurring.

By way of example, the presence of certain conditions with respect to the industrial asset may indicate that an event is likely to occur, where some conditions may make an event more likely to occur than others. For example, a vibration occurring at a specified frequency may indicate imminent failure of a part, which may cause an outage event to occur to the industrial asset. As another example, the presence of hotspots within a particular region of the industrial asset and/or the growth of such hotspots in a particular fashion may indicate that a fire event may be likely to occur, although the fire event may not be imminent. In some embodiments, details of the event may also be predicted. For example, a timeframe when the fire event is likely to occur and/or a profile of likelihood over time may be predicted. Such conditions are represented by the primary state indicators or combinations and associations thereof (e.g., such as secondary state indicators as described below). Thus, based upon the status of one or more primary state indicators (e.g., a first primary state indicator indicates the presence of a hotspot in a first region, a second primary state indicator indicates no abnormal vibrations, etc.), the likelihood of one or more events occurring may be predicted and/or the likelihood of an event occurring during a given period of time, such as a specified health period represented by a health profile. By way of example, the first primary state indicator, indicating the presence of hotspots in the first region, may indicate that there is a high likelihood of a fire event occurring. As another example, the second primary state indicator indicating the lack of abnormal vibrations may indicate that there is a low likelihood of an outage event occurring.

The primary state indicators may be mapped or correlated to events using a variety of techniques. By way of example, in some embodiments, a maintenance technician may manually map primary state indicators to events (e.g., where the maintenance technique specifies what conditions to monitor to determine if an event is likely to occur). In other embodiments, the primary state indicators may be mapped or correlated to events using a machine learning algorithm, such as a Bayesian network algorithm, neural network algorithm, decision tree learning algorithm, classification algorithm, association rule learning algorithm, or other training algorithm. For example, historical data pertaining to one or more industrial assets may be transformed into historical primary state indicators, which are correlated with past events. The relationship between such historical primary state indicators and such past events may be analyzed by a machine learning algorithm to identify primary state indicators that are predictors of an event. Primary state indicators that are determined to be predictors of an event may be mapped to the event. In this way, the present status of one or more primary state indicators may be analyzed to determine the likelihood of an event occurring, for example. In some embodiments, the likelihood or probability of an event occurring may be referred to as a confidence score.

In some embodiments, such machine learning algorithms are continuously or intermittently retrained based upon events that have occurred since the last training session. By way of example, an analysis of an outage event that occurred since a last training session by a machine learning algorithm may determine that a rate of degradation in a coating of a power line may also be a predictor of an outage event. Accordingly, the primary state indicator indicative of power line coating degradation may be mapped to an outage event (e.g., to indicate that there is a relationship between power line coating and outage events, which may be used to predict an outage event).

At 112 in the example method 100, a health profile of the industrial asset is developed based upon the event(s) that are identified as likely to occur to the industrial asset. The health profile describes a general welfare of health of the industrial asset during a specified health period (e.g., which may include a period of time in the future, may overlap the specified data collection period, and/or may not overlap the specified data collection period). In some embodiments, such a health profile may be broken down into parts. For example, a health condition aspect may describe a state of the industrial asset during the specified health period. A health event aspect may describe one or more events that are likely to occur during the specified health period due to the state of the industrial asset and/or may describe an impact(s) such one or more events may have (e.g., including a business impact, performance impact, etc.), for example. A health action aspect may describe maintenance actions and/or operational adjustments (e.g., such as load reduction, etc.) that may reduce the likelihood of the event occurring, prolong the time before such an event occurs, and/or reduce the severity/impact of such an event, for example.

In some embodiments, the health profile further comprises an overall health score, which may be derived based upon a likelihood of failure and/or may be derived based upon the likelihood of one or more events occurring. By way of example, the overall health score may be computed based upon the maximum likelihood of an event occurring (e.g., the health score may be lower for an industrial asset that has a 90% likelihood that at least one event will occur than for an industrial asset that has no likelihood over 50%). As another example, the overall health score may be computed based upon the average likelihood when consideration is given to respective events (e.g., the likelihoods of various events occurring may be averaged). As yet another example, the overall health score may be computed based upon the business impact and/or performance impact of an event occurring (e.g., a first industrial asset may be assigned a lower health score than a second industrial asset due to the business impact of an outage by the first industrial asset being more severe even though the second industrial asset is at a greater risk of experiencing an outage event).

The suggested actions, included in the health action aspect, may be predicted based upon the operational and/or maintenance actions that have been taken in the past to remedy a similar event on the same or a similar industrial asset. By way of example, based upon historical maintenance reports, it may be predicted that an environmental contamination event is often remedied by repairing or replacing a broken seal. According, when it is predicted that an environmental contamination event may occur, a health profile may be developed that includes the suggestion to replace or repair the broken seal. In some embodiments, the health profile may also describe the cost of such a maintenance action and/or may describe the expected impact or longevity of the proposed fix. By way of example, the health profile may describe the cost of repairing the seal versus replacing the seal, the health benefit of repairing vs. replacing the seal (e.g. restoring seal protection to 92% of nominal by repairing, vs. 100% of nominal by replacing) and/or may describe how long respective fixes are expected to last (e.g., before requiring additional maintenance). In some embodiments, the health action recommendations may also consider the benefit timeframes relative to the expected remaining useful life of the asset.

The performance impact, included in the health event aspect, of an event may be predicted based upon data describing the performance impact that occurred when the same or similar industrial asset experienced a similar event in the past. By way of example, the load capacity and/or other output metrics for a transformer, after an event has occurred to the transformer, may be predicted based upon how other similarly configured transformers performed after a similar event occurred. Such a performance impact may include one or more output metrics, start-up times, maintenance expectations post-event, etc. As another example, the performance impact may relate to performance of a system comprising the industrial asset. By way of example, the performance impact may relate to how an outage of a transformer is likely to affect overall performance of an electrical grid comprising the transformer.

The business impact of an event, included in the health event aspect, may be predicted based upon data describing the business impact that occurred when the same or a similar industrial asset experienced a similar event or performance impact in the past. By way of example, the business impact of a fire event to a transformer may be predicted based upon the business impact that was experienced when another transformer (e.g., operating in a similar environment) experienced a fire event. Such a business impact may include predicted fines imposed in view of the event, changes in customer sentiment/satisfaction in view of the event, expected expenditures to remedy the event, changes in employee morale in view of the event, how the event is likely to impact customers (e.g., number of customers expected to be without power and/or length of outage), etc.

The example method 100 ends at 114.

Figure 2:
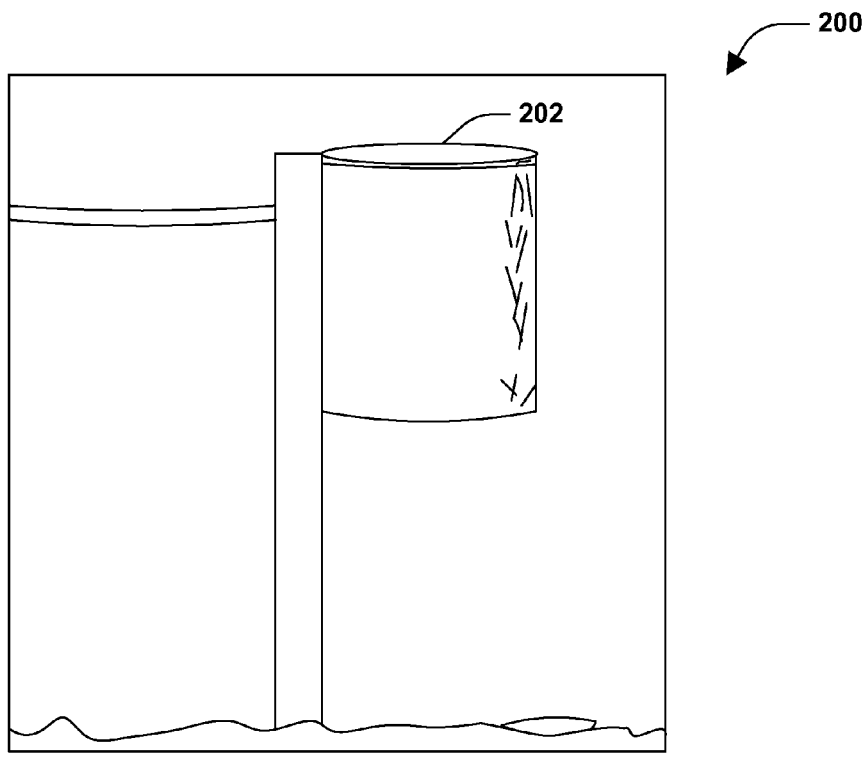
FIG. 2 illustrates example data pertaining to an industrial asset.

FIGS. 2-5 illustrate an example scenario where the method 100 of FIG. 1 may find applicability. Referring initially to FIG. 2, data representative of an image 200 generated during a specified data collection period is acquired. The image depicts, among other things, a transformer 202, and one or more transforms may be applied to the data representative of the image 200. By way of example, a first transform may be applied to the data to determine if any seals are broken on the transformer 202 (e.g., where a first primary state indicator relates to the status of seals) and a second transform may be applied to the data to determine if any fluid is detected in an area neighboring the transformer 202 (e.g., where a second primary state indicator relates to the presence of fluid near the transformer 202).

Figure 3:
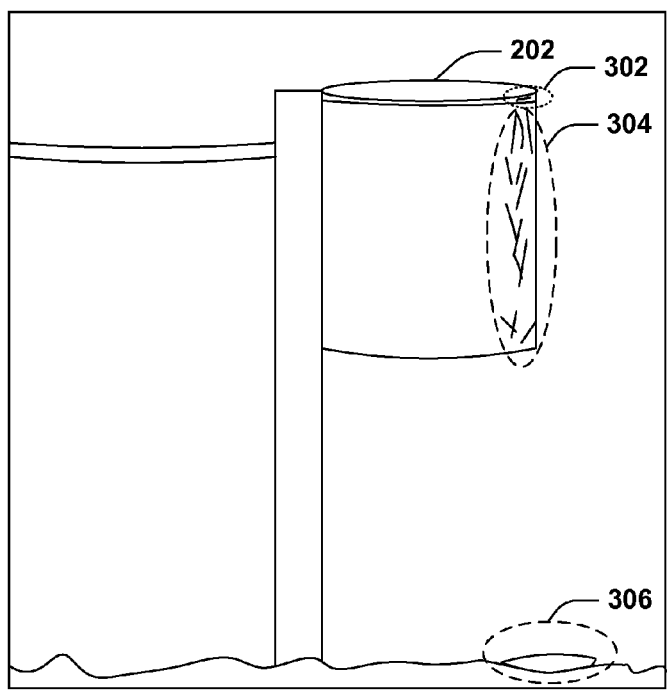
FIG. 3 illustrates example data pertaining to an industrial asset upon applying one or more transforms.

Referring to FIG. 3, the first transform may identify 302 that a seal in an upper quadrant of the transformer 202 appears cracked and may output a first primary state indicator indicating the presence of a broken seal. Moreover, the second transform may identify 304 that fluid appears to be trickling down the side of the transformer 202 and collecting in a region 306 below the transformer 202 (e.g., which may be a symptom associated with a broken seal or a puncture). Accordingly, the second transform may output a second primary state indicator indicating the increasing presence of fluid leaking from the transformer 202. While the foregoing example describes the second transform as generating a second primary state indicator based upon a snapshot of the transformer 202 (e.g., a single image 200 capturing merely an instance in time), in some embodiments, the second transform generates a result based upon data collected over a period of time. By way of example, based upon a series of images collected over a year, the second transform may generate a second primary state indicator that is indicative of a current rate of fluid leakage, a total amount of fluid leakage during the past year, and/or a change in the rate of fluid leakage (e.g., the rate of fluid leakage is accelerating or decelerating (e.g., at a certain rate)).

Referring to FIG. 4, one or more events associated with the first primary state indicator indicating the presence of a broken seal and/or one or more events associated with the second primary state indicator indicating the presence of fluid leakage may be identified. By way of example, from a mapping 400, it may be determined the presence of a broken seal is associated with an environmental contamination event (e.g., a broken seal often leads to environmental contamination) and it may be determined that the presence of fluid leakage is associated with both an environmental contamination event and a fire event (e.g., leaking fluid often leads to environmental contamination and/or fires). Additionally, the mapping 400 may indicate a confidence 402 in the associations or a likelihood that respective events may occur based upon the statuses of the first primary state indicator and the second primary state indicator. For example, the presence of a broken seal may lead to an environmental contamination event merely 30% of the time. As another example, the presence of a fluid leakage may lead to an environmental contamination event 90% of the time and a fire event 20% of the time.

Based upon a finding that one or more events are likely to occur using the mapping 400, a health profile 500, as illustrated in FIG. 5, may be developed. Among other things, the health profile 500 may indicate the risks of one or more events occurring during a specified health period based upon the primary indicators, the business impact of such events to one or more entities associated with the industrial asset during the specified health period, the performance impact of such events to the industrial asset during the specified health period, and/or maintenance actions that may reduce the impact of such events and reduce the likelihood that such events will occur.

By way of example, based upon the mapping 400, the health profile 500 may indicate that there is a 90% likelihood of an environmental event 502 occurring relative to the industrial asset. The health profile 500 may also indicate that such an environmental event 502 is likely to have little to no impact on performance of the transformer but may result in an environmental fine of approximately $20,000 being imposed on an entity responsible for maintaining the transformer. In some embodiments, the health profile may further relate the likelihood to a temporal aspect. For example, there may be a 20% likelihood over a first period of time represented within the specified health period, and may be increasing discretely or continuously to 80% likelihood over a second period of time represented within the specified health period.

As another example, the health profile 500 may indicate that there is a 20% likelihood of a fire event 504 occurring to the industrial asset and may provide predictions regarding the business impact and/or performance impact of such an event. By way of example, if a fire event 504 were to occur to the transformer, it may be predicted (e.g., based upon historical data pertaining to other transformers that have experienced similar events) that an outage will occur for 2 days and affect about 20,000 customers. Further, the repair or replacement cost may be about $10,000 and such an event may impact customer sentiment regarding the power utility by approximately 3 percentage points. In some embodiments, such predictions may be further refined in terms of time. By way of example, an outage may be less severe during some portions of the specified health period than other portions (e.g., due to less demand on a power system—thus better allowing back-up systems to reduce the severity of the outage).

The health profile 500 may also recommend one or more maintenance actions that may reduce the impact of such events. By way of example, based upon the event and/or the primary state indicator indicating the presence of a broken seal, it may be predicted that repair/replacement of the broken seal would reduce (e.g., to nearly zero) the likelihood of an environmental contamination event and/or the likelihood of a fire event occurring. Moreover, the health profile 500 may indicate the expected result of respective maintenance actions. For example, based upon historical data from one or more transformers that had a similar repair/replacement made, it may be estimated that a repair 506 would cost approximately $450 to complete and would likely delay such events from occurring by at least 6 months. A replacement 508 of the seal may cost approximately $2,000 to complete, but the replacement may delay such events from occurring by at least 5 years. In this way, the maintenance technicians are presented with available options for remedying a problem with the transformer, including costs implications and/or other implications that may be desirable to consider when determine what, if any, maintenance to perform.

While the example method 100 of FIG. 1 describes mapping respective primary state indicators to one or more events, in some embodiments, the status of primary state indicators, when considered individually, may not be suggestive of an event. Rather, the combination of two or more primary state indicators may be suggestive of an event. By way of example, the presence of hotspots in a transformer (e.g., as represented by a first primary state indicator) may not suggest that a fire event is likely to occur. Nor may the presence of a specific chemical composition (e.g., odor) in the air surrounding the transformer suggest that a fire event is likely to occur. However, the presence of hotspots in a transformer in combination with the presence of a specific chemical composition in the air may be highly suggestive of thermal breakdown in the transformer which is likely to cause a fire event in the near future.

Figure 6:
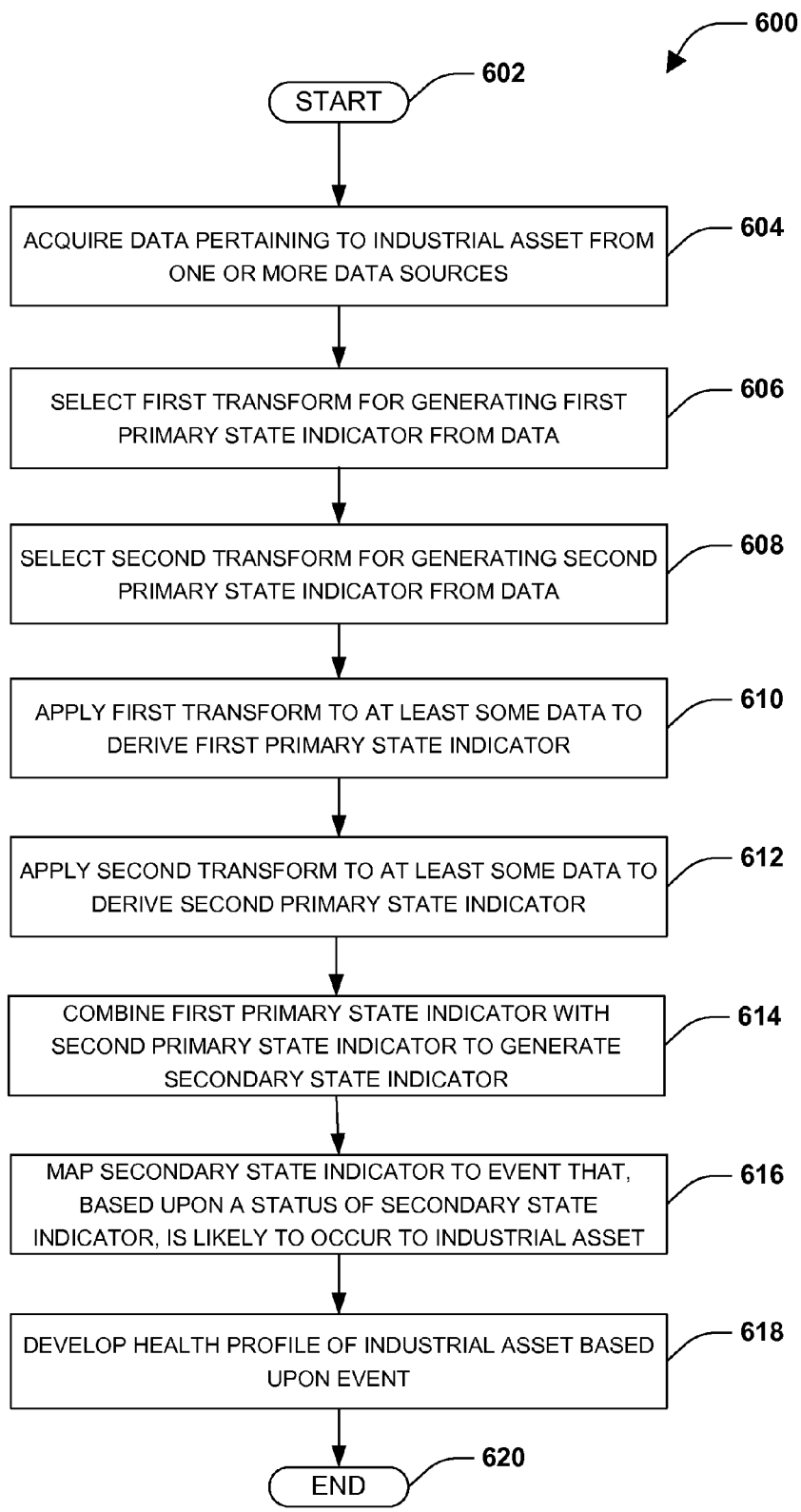
FIG. 6 is a flow diagram illustrating an example method for developing a health profile of an industrial asset.

Accordingly, FIG. 6 illustrates an example method 600 for developing a health profile based upon the primary state indicators, where two or more primary state indicators are analyzed in combination to determine the likelihood of an event. For purpose of brevity, actions described with respect to the method 100 of FIG. 1 are not further described with respect to the method 600 of FIG. 6. However, such actions may also find applicability with the example method 600 of FIG. 6.

The method 600 begins at 602, and data pertaining to an industrial asset are acquired from one or more data sources at 604. At 606 a first transformation technique for generating a first primary state indicator from the data is selected, and at 608 a second transformation technique for generating a second primary state indicator from the data is selected. At 610 the first transformation technique is applied to a first portion of the received data to derive the first primary state indicator, and at 612 the second transformation technique is applied to a second portion of the received data (e.g., where the first portion and the second portion may be a same portion, overlapping portions, or different portions of the data). Respective primary state indicators may be indicative of symptoms of a problem (e.g., elevated gas concentrations, fluid leakage, gas leakage, elevated internal temperatures, etc.) and/or may be indicative of diagnosis (e.g., a broken seal is likely causing the fluid leakage or gas leakage, a malfunctioning heat exchanger is likely causing the elevated internal temperatures, etc.).

At 614 in the example method 600, the first primary state indicator and the second primary state indicator are combined to generate a secondary state indicator, where the secondary state indicator describes the statuses of the first primary state indicator and the second primary state indicator. For example, the presence of an abnormal vibration, as indicated by a first primary state indicator, may be combined with the presence of hotspots in a particular region of a transformer, to generate a secondary state indicator that indicates that both an abnormal vibration and a hotspot(s) are present and/or that indicates a common cause (e.g., diagnosis) of both an abnormal vibration and a hotspot(s). As with primary state indicators, secondary state indicators may be indicative of symptoms of a problem and/or may be indicative of simple or compound diagnoses.

At 616 in the example method 600, the secondary state indicator is mapped to an event that, based upon the status of the secondary state indicator, is likely to occur to the industrial asset. By way of example, based upon the secondary state indicator indicating the presence of both an abnormal vibration and a hotspot in a particular region of a transformer, it may be determined that an outage is highly likely to occur within a certain timeframe and with a certain confidence.

At 618 in the example method 600, a health profile is developed based upon findings regarding the likelihoods of one or more events occurring. Again, such health profile may include diagnostic information (e.g., identifying failing equipment and/or element), potential performance impact of an event, potential business impact of the event, etc. In some embodiments, the health profile may also include confidence profiles related to the diagnostic information, performance impacts, business impacts, likelihood of an event occurring, etc.

The example method 600 ends at 620.

It may be appreciated that various primary state indicators may be combined and analyzed (e.g., mapped to determine if the combination of such primary state indicators are suggestive of an event) until a specified stopping criteria as been met. By way of example, such primary state indicators may be combined until all available combinations of primary state indicators have been tested. Moreover, while reference is made to combining two primary state indicators to generate a secondary state indicator, in some embodiments, a secondary state indicator may be representative of the statuses of more than two primary state indicators.

Figure 7:
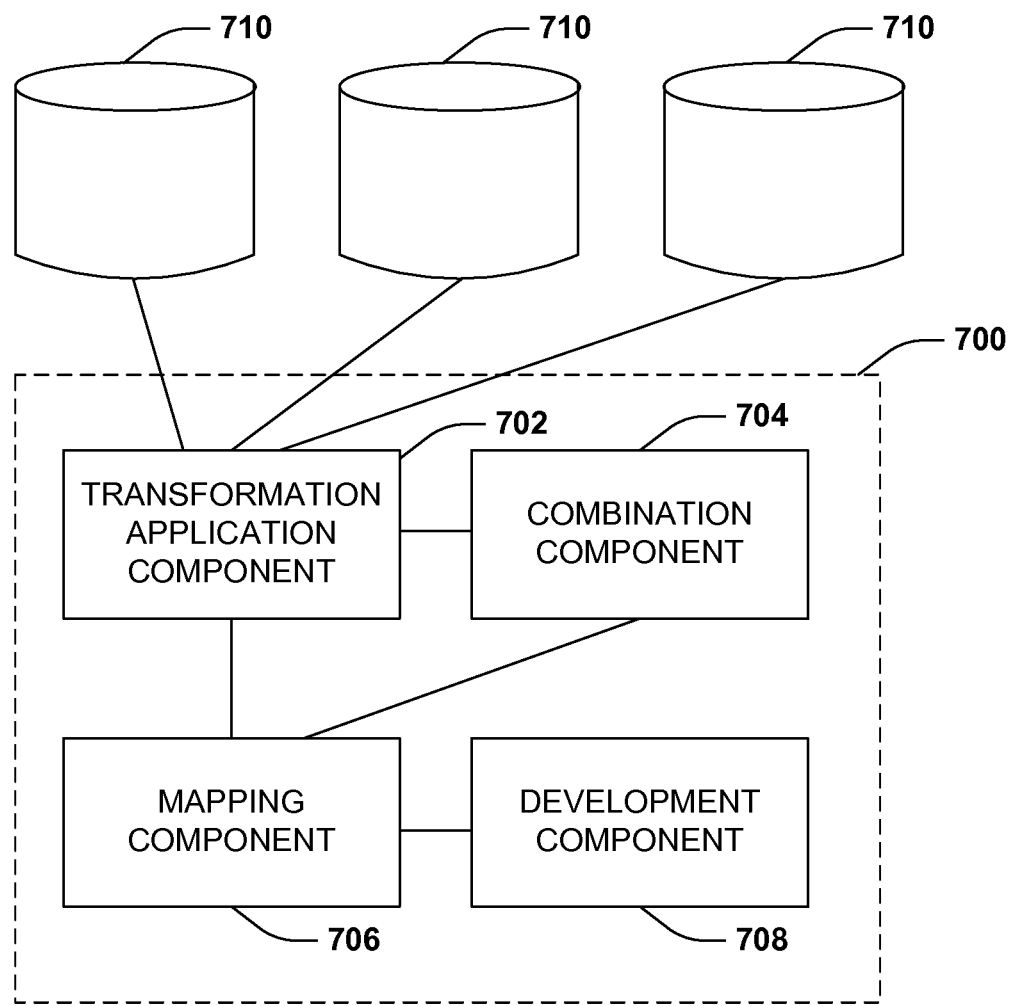
FIG. 7 is a component block diagram of an example system for developing a health profile of an industrial asset.

FIG. 7 is a component block diagram illustrating an example system 700 for developing a health profile of an industrial asset. The example system 700 comprises a transformation application component 702, a mapping component 704, a combination component 706, and a development component 708. It may be appreciated that features described with respect to the foregoing methods 100 and 600 may also find applicability with respect to the system 700 of FIG. 7, although for brevity such features are not further described.

The transformation application component 702 is configured to receive data pertaining to an industrial asset from one or more databases 710 and is configured to apply one or more transforms to the data to derive primary state indicators. In some embodiments, the transformation application component 702 is configured to initially organize the data based upon the type of information represented by the data. By way of example, data representative of aerial images may be binned into a first bin and data representative of thermal images may be binned into a second bin. The transform(s) applied to respective bins of data may be specific to the type of information represented by the data. By way of example, a first set of transforms may be applied to data representative of aerial images to derive a first set of primary state indicators (e.g., indicative of line sag, line coating degradation, etc.) and a second set of transforms may be applied to data representative of thermal images to derive a second set of primary state indicators (e.g., indicative of the presence of hotspots, location of hotspots within the industrial asset, changes in hotspots over time, etc.).

The combination component 704 is configured to combine two or more primary state indicators to generate a secondary state indicator. By way of example, a first primary state indicator describing the presence of hotspots in a transformer may be combined with a second primary state indicator describing the presence of a specific chemical composition in the air around the industrial asset to generate a secondary state indicator which indicates that both hotspots and a specific chemical composition are present. In this way, events that may merely occur when two conditions are concurrently present and/or events that have a much highly likelihood of occurring when the two (or more) conditions are concurrently present may be identified by the mapping component 706, for example.

The mapping component 706 is configured to map at least one of a primary state indicator(s) or a secondary state indicator(s) to an event(s) that, based upon a status(es) of the primary state indicator(s) and/or secondary state indicator (s), are likely to occur to the industrial asset. That is, stated differently, particular conditions within and/or surrounding the industrial asset may foreshadow an event (e.g., such as a fire event, outage, etc.). Such conditions are represented by the primary state indicators and/or the combination of two or more such conditions are represented by the second state indicators. The mapping component 706 may utilize one or more algorithms, such as machine learning algorithms to identify conditions that, when present, often precede an event. The mapping component 706 may subsequently review such primary state indicators and/or secondary state indicators to determine if such conditions are present. Based upon the presence or absence of such conditions, a probability of one or more events occurring may be predicted. By way of example, the presence of hotspots, as indicated by a first primary state indicator may increase the likelihood of a fire event occurring. However, the absence of a particular chemical composition in the air (e.g., a particular odor in the air), as indicated by a second primary state indicator, may decrease the likelihood of a fire event occurring (e.g., because, based upon historical data, the particular chemical composition in the air almost always precedes a fire event in such an industrial asset).

The output of the mapping component 706 may include events that are more likely to occur than a specified likelihood threshold. For example, the output of the mapping component 706 may be events that have at least a 20% likelihood of occurring. Moreover, in some embodiments, the output may further comprise a confidence score (e.g., probability) or profile indicative of how likely an event is to occur. By way of example, the mapping component 706 may output a confidence score indicating that a fire event has a 90% likelihood of occurring within a specified time frame.

The development component 708 is configured to develop a health profile of the industrial asset based upon the event(s) identified by the mapping component 706 as likely to occur (e.g., events that are more likely to occur than a specified likelihood threshold). The health profile may comprise various diagnostic and/or predictive aspects that assess the value or importance of performing maintenance actions on the industrial profile. By way of example, in some embodiments, the health profile comprises a health action aspect describing a maintenance or operational action that will mitigate the event from occurring (e.g., delay the event, reduce the likelihood of the event occurring, reduce the impact of the event, etc.). In some embodiments, the health action aspect may include one or more diagnostic actions (e.g., collect a new type of data, increase the frequency with which a particular type of data is collected, perform a new field test, etc.) that may provide recommendations for improving diagnostic accuracy and/or for improving confidence profiles regarding conditions of an industrial asset, diagnosed causes, events, and/or impacts, for example.

In some embodiments, the health action aspect further describes a first impact that a first maintenance action will likely have on a health of the industrial asset and a second impact that a second maintenance action will likely have on the health of the industrial asset. By way of example, a repair of equipment may result in the longevity of the industrial asset increasing by one year, whereas a replacement of the equipment may result in the longevity of the industrial asset increasing by 3 years. The health action aspect may also recommend an operational action such as reducing workload or reducing frequency of use, pending and/or following execution of the repair or replacement, etc. that will likely decrease the risk of an event occurring in the meantime and/or will likely limit further damage, for example. In some embodiments, a health action plan may also include a sequence of actions which may describe not only what should be done in the near term, but what should be done in the mid to long term within the selected health period, based upon the current condition at time of health assessment and/or the expected impact of the recommended action plan.

In some embodiments, the health profile further comprises a business impact portion describing a likely business impact on one or more entities associated with the industrial asset (e.g., operating entity, owning entity, entity responsible for maintenance of the industrial asset, customers, etc.) if an identified event does occur, and/or a performance impact portion describing a likely performance impact to the industrial asset if the event does occur.

Figure 8:
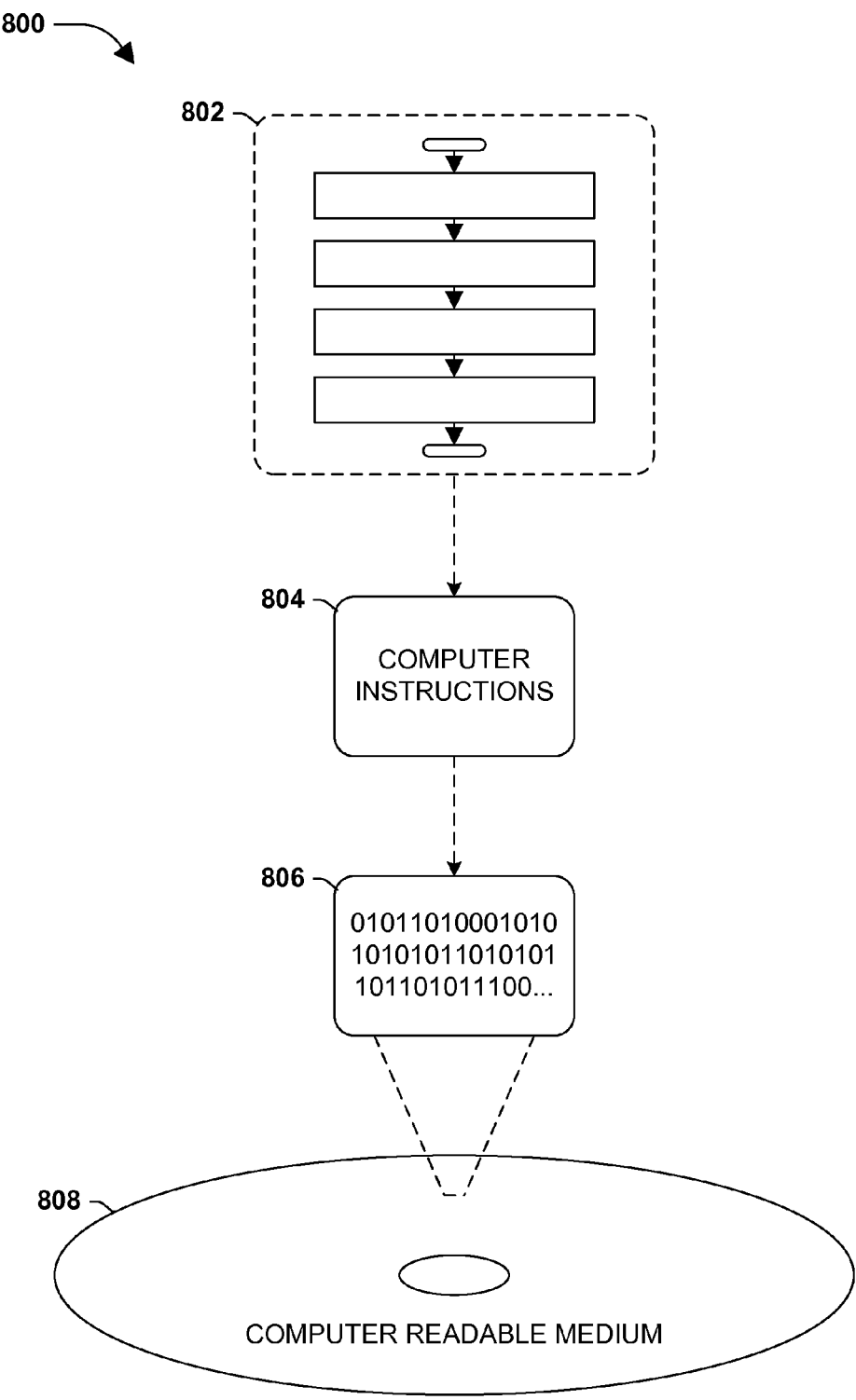
FIG. 8 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An example computer-readable medium that may be devised in these ways is illustrated in FIG. 8, wherein the implementation 800 comprises a computer-readable medium 808 (e.g., a flash drive, CD-R, DVD-R, application-specific integrated circuit (ASIC), field-programmable gate array (FPGA), a platter of a hard disk drive, etc.), on which is encoded computer-readable data 806. This computer-readable data 804 in turn comprises a set of processor-executable instructions 804 that when executed via a processing unit(s) is configured to operate according to one or more of the principles set forth herein. In some embodiments, the processor-executable instructions 804 may be configured to perform a method 802, such as at least some of the example method 100 of FIG. 1 and/or at least some of example method 600 of FIG. 6, for example. In other embodiments, the processor-executable instructions 804 may be configured to implement a system, such as at least some of the example system 700 of FIG. 7, for example. Many such computer-readable media may be devised by those of ordinary skill in the art that are configured to operate in accordance with one or more of the techniques presented herein.

Figure 9:
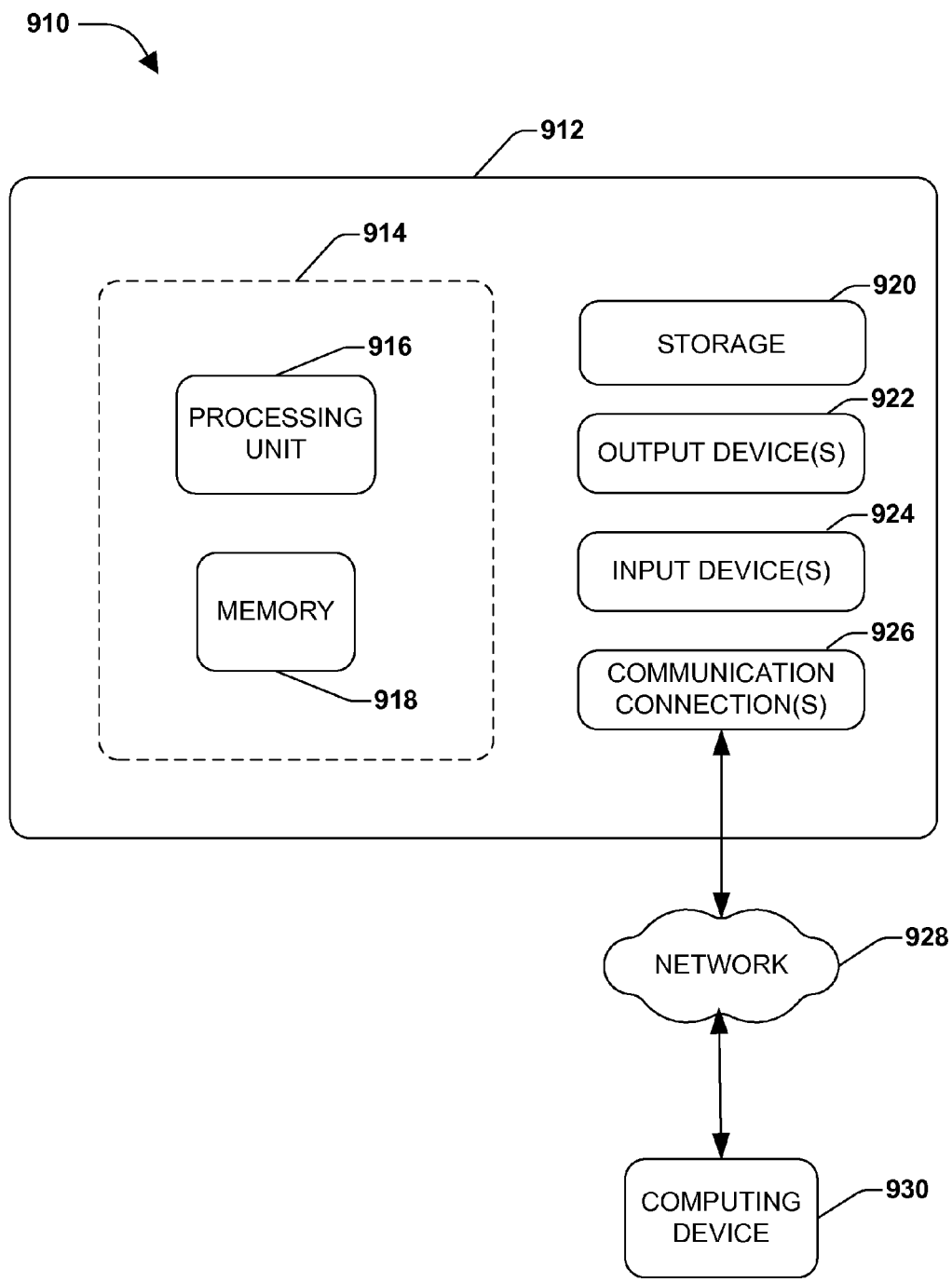
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 910 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example), or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via a network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Further, unless specified otherwise, "first," "second," and/or the like are not intended to imply a temporal aspect, a spatial aspect, an ordering, etc. Rather, such terms are merely used as identifiers, names, etc. for features, elements, items, etc. (e.g., "a first channel and a second channel" generally corresponds to "channel A and channel B," where channel A and channel B may be two different channels, two identical channels, or the same channel.

Although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. Similarly, illustrated ordering(s) of acts is not meant to be limiting, such that different orderings comprising the same or different (e.g., numbers) of acts are intended to fall within the scope of the instant disclosure. In addition, while a particular feature of the disclosure may have been disclosed with respect to only one of several implementations, such feature may be combined with one or more other features of the other implementations as may be desired and advantageous for any given or particular application.

What is claimed is:

1. A system for developing a health profile of an industrial asset, comprising:
a processor; and
memory comprising processor-executable instructions that when executed by the processor cause performance of operations, the operations configured to:
retrieve data pertaining to the industrial asset, wherein the data comprises at least one of data yielded from one or more electronic sensor devices or observational data representative of at least one of a video recording, a still image, an audio recording, or a chemical analysis of an area proximate the industrial asset;
apply a first transform to a first portion of the data pertaining to the industrial asset to derive a first primary state indicator;
predict a future event, associated with the industrial asset, predicted to occur at a future point in time based upon the first primary state indicator;
develop the health profile of the industrial asset based upon the future event;
output a confidence profile indicative of a probability of the future event occurring, wherein the confidence profile comprises a confidence measure indicating a precision of the prediction of the future event occurring; and
facilitate performance of an action upon the industrial asset based upon the health profile, wherein the action is determined to be performed based upon the confidence measure indicating that the probability of the future event occurring exceeds a threshold.

2. The system of claim 1, wherein the operations are configured to:
receive a user specified time period for evaluating the data pertaining to the industrial asset; and
retrieve the first portion of the data based upon the user specified time period.

3. The system of claim 1, wherein the health profile comprises a health action aspect describing an impact of performing the action upon the industrial asset.

4. The system of claim 2, wherein the impact specifies a cost to perform a repair action compared to performing a replacement action for the industrial asset.

5. The system of claim 2, wherein the impact specifies a reduced likelihood of the future event occurring after the action is performed.

6. The system of claim 1, wherein the operations are configured to modify the confidence profile based upon a completeness of the first portion of the data.

7. The system of claim 1, wherein the operations are configured to modify the confidence profile based upon at least one of a quality, a sensitivity, or a freshness of the first portion of the data.

8. The system of claim 1, wherein the operations are configured to apply a second transform to a second portion of data pertaining to the industrial asset to derive a second primary state indicator.

9. The system of claim 8, wherein the operations are configured to combine the first primary state indicator with the second primary state indicator to generate a secondary state indicator.

10. The system of claim 7, wherein the modifying comprises at least one of narrowing, widening, shifting, or skewing the confidence profile.

11. The system of claim 1, the data representative of at least one of measurements or observations recorded during a specified data collection period and the health profile representative of a health of the industrial asset during a specified health period, the specified data collection period different than the specified health period.

12. The system of claim 1, wherein
the data is yielded from a robotic inspection of the industrial asset.

13. A method for developing a health profile of an industrial asset, the method involving a computing device comprising a processor, and the method comprising:
executing, on the processor, instructions that cause the computing device to perform operations, the operations comprising:
acquiring data pertaining to the industrial asset, wherein the data comprises at least one of data yielded from one or more electronic sensor devices or observational data representative of at least one of a video recording, a still image, an audio recording, or a chemical analysis of an area proximate the industrial asset;
applying a first transform to the data to derive a first primary state indicator;
predicting a future event, associated with the industrial asset, predicted to occur at a future point in time based upon the first primary state indicator;
developing the health profile of the industrial asset based upon the future event
outputting a confidence profile indicative of a probability of the future event occurring, wherein the confidence profile comprises a confidence measure indicating a precision of the prediction of the future event occurring; and
facilitating performance of an action upon the industrial asset based upon the health profile, wherein the action is determined to be performed based upon the confidence measure indicating that the probability of the future event occurring exceeds a threshold.

14. The method of claim 13, the primary state indicator indicative of a condition of one or more aspects of the industrial asset.

15. The method of claim 13, the health profile comprising a health action aspect describing at least one of a maintenance action, a diagnostic action, or an operational action.

16. The method of claim 15, the health action aspect describing a first impact that the action is predicted to have on a health of the industrial asset and a second impact that a second action is predicted to have on the health of the industrial asset.

17. The method of claim 13, the health profile comprising a health event aspect describing a business impact on an entity associated with the industrial asset if the future event does occur.

18. The method of claim 13, the health profile comprising a health event aspect describing a performance impact to the industrial asset if the future event does occur.

19. The method of claim 13, comprising:
applying a second transform to the data to derive a second primary state indicator;
combining the first primary state indicator with the second primary state indicator to generate a secondary state indicator; and
mapping the secondary state indicator to a second future event that, based upon a status of the secondary state indicator, is predicted to occur to the industrial asset.

20. A non-transitory computer readable storage medium comprising processor executable instructions that when executed via a processor perform a method, comprising:
acquiring data pertaining to the industrial asset, wherein the data comprises at least one of data yielded from one or more electronic sensor devices or observational data representative of at least one of a video recording, a still image, an audio recording, or a chemical analysis of an area proximate the industrial asset;
applying a first transform to the data pertaining to the industrial asset to derive a first primary state indicator;
predicting a future event, associated with the industrial asset, predicted to occur at a future point in time based upon the primary state indicator;
developing the health profile of the industrial asset based upon the future event;
outputting a confidence profile indicative of a probability of the future event occurring, wherein the confidence profile comprises a confidence measure indicating a precision of the prediction of the future event occurring; and
facilitating performance of an action upon the industrial asset based upon the health profile, wherein the action is determined to be performed based upon the confidence measure indicating that the probability of the future event occurring exceeds a threshold.

* * * * *